United States Patent
Goldthwaite et al.

(10) Patent No.: US 7,336,973 B2
(45) Date of Patent: Feb. 26, 2008

(54) MOBILE COMMUNICATION DEVICE EQUIPPED WITH A MAGNETIC STRIPE READER

(75) Inventors: Scott Goldthwaite, Hingham, MA (US); William Graylin, Woburn, MA (US)

(73) Assignee: Way Systems, Inc, Woburn, MA (US)

( * ) Notice: Subject to any disclaimer, the term of this patent is extended or adjusted under 35 U.S.C. 154(b) by 651 days.

(21) Appl. No.: 10/695,585

(22) Filed: Oct. 28, 2003

(65) Prior Publication Data

US 2004/0087339 A1    May 6, 2004

Related U.S. Application Data

(60) Provisional application No. 60/422,384, filed on Oct. 30, 2002.

(51) Int. Cl.
*H04B 1/38* (2006.01)

(52) U.S. Cl. .................... 455/558; 455/550.1

(58) Field of Classification Search ........ 455/557–559, 455/550.1
See application file for complete search history.

(56) References Cited

U.S. PATENT DOCUMENTS

| | | | |
|---|---|---|---|
| 5,208,446 A | 5/1993 | Martinez | |
| 5,870,459 A | 2/1999 | Phillips | |
| 6,292,561 B1 | 9/2001 | Benson | |
| 6,311,241 B1 * | 10/2001 | Hofmann | ............. 455/558 |
| 2002/0002507 A1 | 1/2002 | Hatakeyama | |
| 2002/0025796 A1 | 2/2002 | Taylor | |
| 2002/0046185 A1 | 4/2002 | Villart | |
| 2002/0196127 A1 * | 12/2002 | Benson | ............. 340/10.4 |
| 2003/0004876 A1 | 1/2003 | Jacobson | |

FOREIGN PATENT DOCUMENTS

| | | |
|---|---|---|
| WO | WO 96/26505 | 8/1996 |
| WO | WO 99/66752 | 12/1999 |
| WO | WO 01/86599 | 11/2001 |

* cited by examiner

*Primary Examiner*—Philip J. Sobutka
(74) *Attorney, Agent, or Firm*—AKC Patents LLC; Aliki K. Collins

(57) ABSTRACT

A wireless mobile device is adapted to access a wireless network and includes a subscriber identification module (SIM) card slot and a magnetic stripe reader module electrically connected to the SIM card slot and thereby to the wireless mobile phone. The magnetic stripe reader module is adapted to receive and read information stored in a magnetic stripe and transmit this information to an entity through the wireless mobile device and the wireless network. The wireless mobile device of this invention is used to conduct financial transactions using a payment card comprising a magnetic stripe. The financial transactions include face-to-face or remote purchases and payment with the payment card through a financial institution.

21 Claims, 7 Drawing Sheets

MOBILE COMMUNICATION DEVICE EQUIPPED WITH A MAGNETIC STRIPE READER

CROSS REFERENCE TO RELATED CO-PENDING APPLICATIONS

This application claims the benefit of U.S. provisional application Serial No. 60/422,384 filed on Oct. 30, 2002 and entitled MOBILE COMMUNICATION DEVICE EQUIPPED WITH A MAGNETIC STRIPE READER which is commonly assigned and the contents of which are expressly incorporated herein by reference.

FIELD OF THE INVENTION

The present invention relates to mobile communication devices, and more particularly to a mobile communication device that is equipped with a magnetic stripe reader for conducting financial transactions with a payment card comprising a magnetic stripe.

BACKGROUND OF THE INVENTION

The primary technology utilized for credit and debit payment cards today is a magnetic stripe. The payment card's magnetic stripe contains a customer's account number and other necessary information to conduct a payment transaction with a merchant. In a typical "face-to-face" payment transaction, the customer or sales clerk swipes the payment card through a merchant's Point of Sale (POS) terminal that reads the information that is stored in the magnetic stripe. The merchant's POS system connects to a payment network to validate and approve the payment transaction and prints a receipt. The customer signs the receipt to complete the payment transaction. For payment transactions involving debit cards the customer may be requested to type in a Personal Identification Number (PIN) to authorize the transaction and/or sign the printed receipt. The process of swiping the card through the POS and either signing the sales receipt or typing in a PIN provides proof that the card holder is present with the payment card at the time of purchase, creating a "Card Present" type of payment transaction.

Customers also use these magnetic stripe payment cards for non "face-to-face" payment transactions, to purchase goods and services from remote merchants via the Internet, the telephone or mail order catalogs. For these types of non "face-to-face" payment transaction, there is no merchant POS terminal to accept the magnetic stripe payment card. Referring to FIG. 1, in a typical non "face-to-face" payment transaction a customer 102 makes a purchase from a remote merchant server 104 via the Internet 80. The customer 102 makes his purchase selection and fills out a payment form on the website of the merchant. The information on the payment form includes type of payment card (credit or debit), payment card number and expiration date. The merchant server 104 transfers the type of payment card, payment card number, expiration date, and information about the purchase including price, quantity, item number, and date of transaction to a payment server 106. The payment server 106 contacts the financial institution 112 that has issued the specific payment card and handles the payment transactions for the specific payment card. The financial institution 112 executes the payment transaction and sends a confirmation notice to the payment server 106. The payment server 106 routes the confirmation notice to the merchant server 104 and the merchant server 104 fulfills the customer's purchase order. The payment card information and the purchase order information are usually encrypted for security purposes. The encrypted information may be transferred via Internet, fax, or telephone connections 80, 82, and 84. When the transaction occurs via the telephone the customer 102 either dictates the card number and expiration date to a sales representative or enters them using the telephone keypad. In these non-face-to-face payment transactions via the Internet, fax, telephone, or mail order, the merchant server 104 has no means of verifying the presence of the payment card (i.e., card-not-present (CNP)) and the identity of the customer 102. This lack of authentication of the customer 102 and the payment card presents an opportunity for fraud. For example, a person other than the cardholder may obtain the payment card number and expiration date from a discarded payment form and use them to make new purchases. As a result the merchant pays significantly higher transaction fees for CNP transactions than those for Card Present transactions.

The ubiquity of mobile phones combined with magnetic stripe readers provides a new range of POS terminals for merchants and customers to conduct financial services transactions. While there are several magnetic stripe readers available today for mobile phones (Semtek, Symbol, Apriva), these prior art magnetic stripe readers require a customized interface for each different type of mobile communication device and the specific network that is connected to. Accordingly, there is a need for a universal connector that can be used in all types of mobile phones and all networks.

The general concept of a universal connector that can connect to any type of mobile phone and network is described in PCT patent application No. WO 99/66752, entitled "Communication Method and Apparatus Improvements", the entire content of which is incorporated herein by reference. Referring to FIG. 2, this universal connector 200 connects to the mobile phone's existing Subscriber Identification module (SIM) slot 204 and utilizes a Central Processor Unit (CPU) 202 to coordinate the activities of multiple SIM cards 152, 156 and a full-size external smart card 153. This universal connector may be implemented as an attachment to a mobile phone or may be embedded in the mobile phone. Although this implementation includes several SIM cards and a card reader for regular contact type smart cards, it does not include a magnetic stripe reader. Accordingly, there is still a need for a universal magnetic stripe reader that can be attached to any phone and any network.

SUMMARY OF THE INVENTION

In general, in one aspect the invention features a wireless mobile device adapted to access a wireless network. The wireless mobile device includes a subscriber identification module (SIM) card slot and a magnetic stripe reader module electrically connected to the SIM card slot and thereby to the wireless mobile device. The magnetic stripe reader module is adapted to receive and read information stored in a magnetic stripe and the wireless mobile device is adapted to transmit this information to an entity via the wireless network.

Implementations of this aspect of the invention may include one or more of the following features. The information stored in the magnetic stripe includes cardholder identification information, card identification information, authentication information, card issuer information, and financial institution information. The wireless mobile device may further include a memory, a SIM card connected to the SIM card slot and authenticating the wireless mobile device to the wireless network, a Central Processing Unit (CPU) and a first application program associated with the memory and the CPU and being adapted to receive and transmit instructions from the magnetic stripe reader module to the wireless mobile device and the reverse. The wireless mobile device may further include a second application program associated with the memory and the CPU and being adapted to route and transmit data and information among the wireless mobile device, the magnetic stripe reader module, and other interfaces connected to the CPU. These other interfaces may be smart card interfaces, infrared transceiver interfaces, serial communication interfaces, or contactless card interfaces. An infrared transceiver interface may be used to connect to an external device having an infrared transceiver. One example of such an external device is a printer used for printing payment receipts. The first and second application programs may be stored in the CPU, the SIM card, an external SIM card, the magnetic stripe, a contactless smart card, or an external card. The wireless mobile device may be a mobile phone, a personal digital assistant, a pager, a wireless laptop computer, a personal computer, a television remote control, and combinations thereof. The wireless network may be a wireless wide area network (WWAN), a wireless local area network (WLAN), a private network, or a personal area network (PAN). The wireless wide area network (WWAN) may be a Global System for Mobile Communications (GSM), a General Packet Radio Service (GPRS), a Code Division Multiple Access (CDMA), CDMA 2000, or wideband CDMA (WCDMA). The wireless mobile device may be used for making financial transactions between a user and an entity with a payment card comprising the magnetic stripe over the network. The financial transactions between the user and the entity may be face-to-face or remote.

In general, in another aspect the invention features an electronic communication method including purchasing a good or a service from a merchant, and paying with a payment card comprising a magnetic stripe via a wireless mobile device. The wireless mobile device is adapted to access a wireless network and includes a subscriber identification module (SIM) card slot and a magnetic stripe reader module electrically connected to the SIM card slot and thereby to the wireless mobile device. The magnetic stripe reader module is adapted to receive and read information stored in the magnetic stripe and transmit the information to an entity via wireless mobile device and the wireless network.

In general, in another aspect the invention features an electronic payment method utilized by a customer to pay a merchant with a payment card comprising a magnetic stripe for a face-to-face purchase of a good or service. The method includes placing an order by the customer for the purchase of the good or service to the merchant and providing a wireless mobile device wherein the wireless mobile device is adapted to access a wireless network and comprises a subscriber identification module (SIM) card slot and a magnetic stripe reader module electrically connected to the SIM card slot and wherein the magnetic stripe reader module is adapted to receive and read information stored in the magnetic stripe and transmit the information via the wireless network. Next, entering information of the purchase in the wireless mobile device, swiping the magnetic stripe through the magnetic stripe reader, and retrieving payment card identification information from the magnetic stripe and authorizing payment for the good or service. Next, formatting the purchase information, the payment card identification information and the payment authorization into a first message and sending the first message to an authentication server via the wireless network, and authenticating and sending the first message by the authentication server to a financial institution. Next, registering the purchase information and sending approval for the payment by the financial institution to the authentication server. Finally, forwarding the payment approval to the wireless mobile device and fulfilling the order to the customer by the merchant.

In general, in yet another aspect the invention features an electronic payment method utilized by a customer to pay a merchant with a payment card comprising a magnetic stripe for a remote or non face-to-face purchase of a good or service. The method includes placing an order by the customer for the purchase of the good or service to a merchant server via a first network and choosing to pay via a wireless mobile device wherein the wireless mobile device is adapted to access a wireless network and comprises a subscriber identification module (SIM) card slot and a magnetic stripe reader module electrically connected to the SIM card slot and wherein the magnetic stripe reader module is adapted to receive and read information stored in the magnetic stripe and transmit the information via the wireless network. Next, providing the merchant server with identification information for the wireless mobile device and creating a digital order comprising purchase information and the identification number for the wireless mobile device by the merchant server. Next, routing the digital order to an authentication server via the first network, formatting the digital order into a first message wherein the first message is adapted to be transmitted over the wireless network and routing the first message over the wireless network to the wireless mobile device. Next, displaying the first message on the wireless mobile device, and requesting and receiving authorization of payment from the customer via the wireless mobile device. Next, swiping the magnetic stripe through the magnetic stripe reader, retrieving payment card identification and security information, and formatting authorization result and payment card identification and security information into a second message and routing the second message to the authentication server. Next, authenticating and routing the second message to a financial institution, wherein the financial institution is the issuer of the payment card. Finally, approving and executing the payment at the financial institution, forwarding the payment approval to the authentication server and from the authentication server to the wireless mobile device and fulfilling the order to the customer by the merchant.

Among the advantages of this invention may be one or more of the following. Combining a magnetic stripe reader with a wireless mobile device can dramatically increase the number of magnetic stripe payment card reader points of sales (POS) in the marketplace. The increased number of POS offers convenience to consumers and more opportunities to merchants. The majority of POS terminals available to merchants today require a wired land-line or Public Switched Telephone Network (PSTN) connection. In many situations, merchants do not have access to a PSTN connection, and therefore a mobile phone equipped with a magnetic stripe card reader enables merchants to accept payment cards anywhere. These merchants include taxicabs, vending machines and "push cart" vendors.

The invention defined in this application specifies that the magnetic stripe reader module connects to the wireless mobile device through the Subscriber Identification Module (SIM) circuitry on a GSM mobile phone. Although a mobile device may have many external interface points (i.e. serial, USB, Bluetooth, Infrared), these communication protocols, while standard, are implemented differently for each mobile device, therefore connecting a magnetic stripe reader to any other interface point on the mobile device would require a specific interface application developed for each mobile device. Most mobile devices do not allow applications to be installed or modified on the device once the device has been distributed to customers. The SIM port on a GSM device is a common and standard interface on any GSM device. Therefore, using the SIM port on the GSM device provides a universal connection point for interfacing with a magnetic stripe card reader. The advantage of the present invention is that the magnetic stripe reader module can be used to retrofit any mobile device that does not allow reprogramming with or without the permission or knowledge of the mobile device manufacturer or the mobile network operator.

Another advantage of the present invention is the creation of many types of systems and methods for using payment cards comprising a magnetic stripe for purchasing and fulfillment of goods and services because of the network connectivity established by the connected mobile device. As was mentioned above, the present invention provides a POS system for mobile merchants (i.e. taxi cab drivers and fast food vendors) and allows them to accept payment cards comprising a magnetic stripe as a form of payment. The present invention also enables consumers to make remote purchases using payment cards comprising a magnetic stripe as a method of payment.

DETAILED DESCRIPTION OF THE INVENTION

Figure 1:
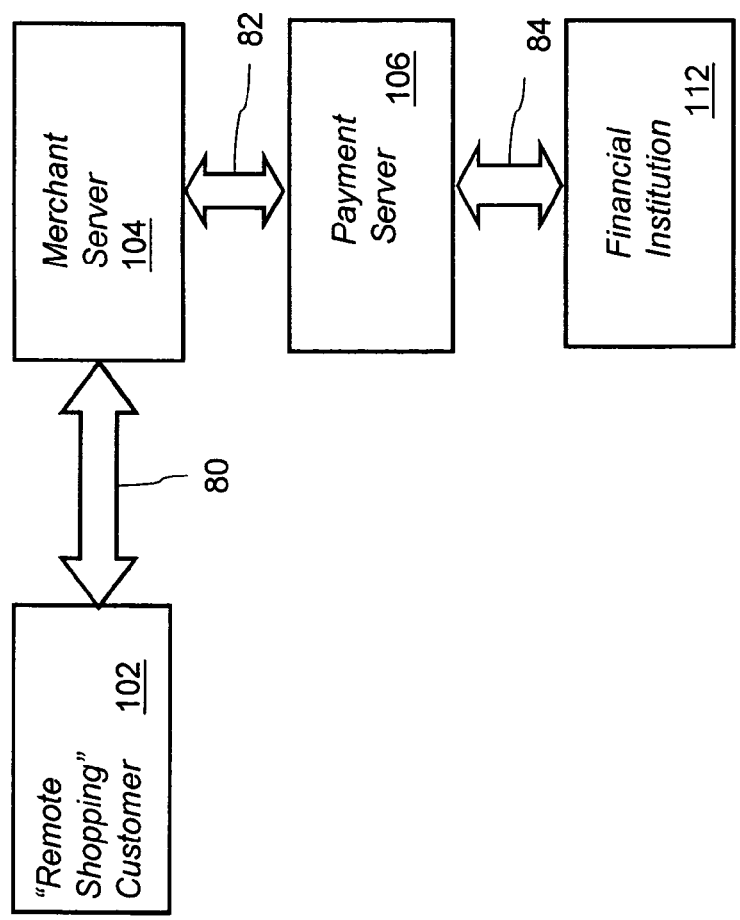
FIG. 1 is a block diagram of a prior art system for existing "card-not-present" (CNP) credit/debit card payments.
Figure 2:
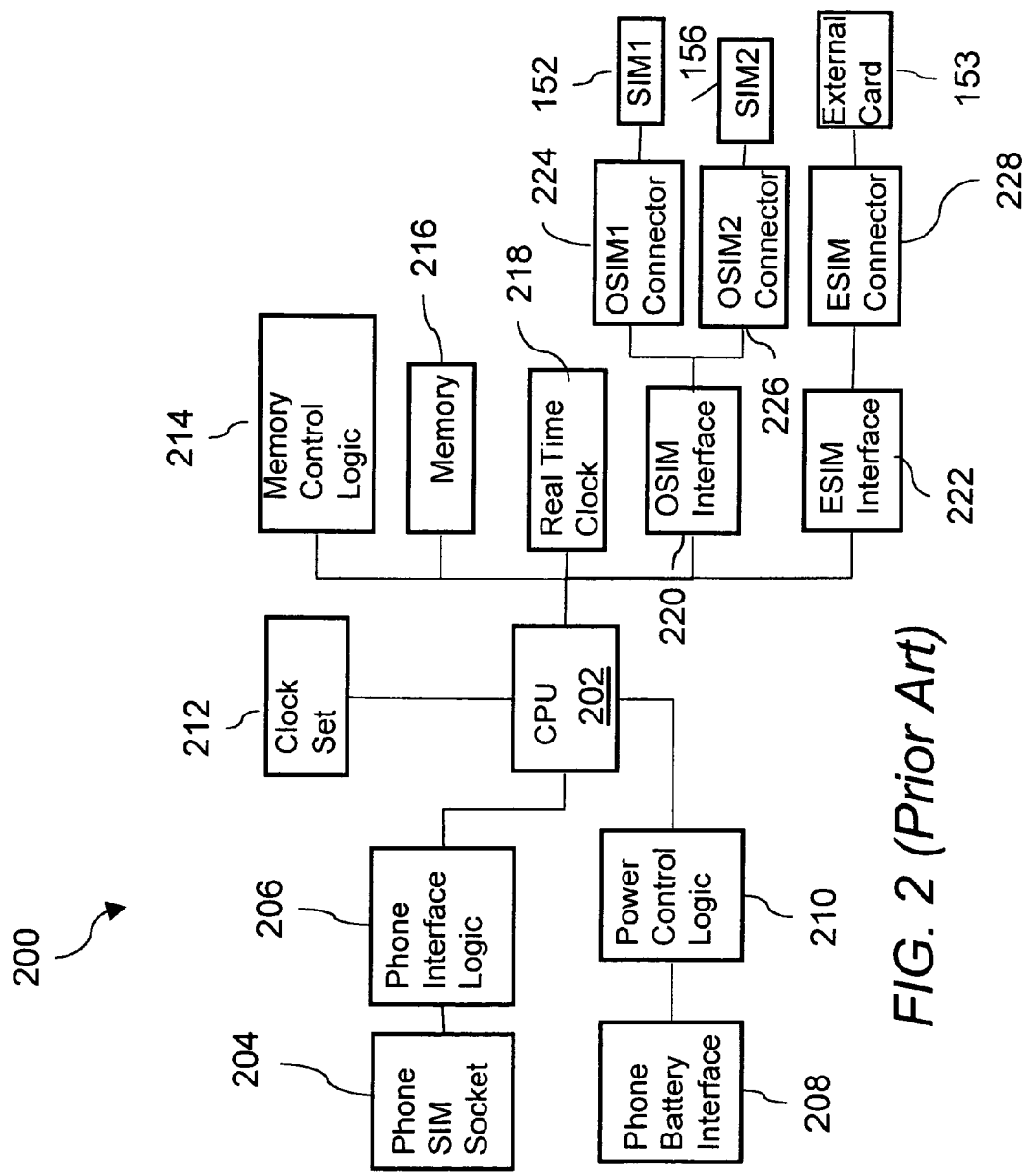
FIG. 2 illustrates a circuitry that converts a Single-SIM GSM phone into a Dual-SIM/Dual-Slot GSM phone.
Figure 3:
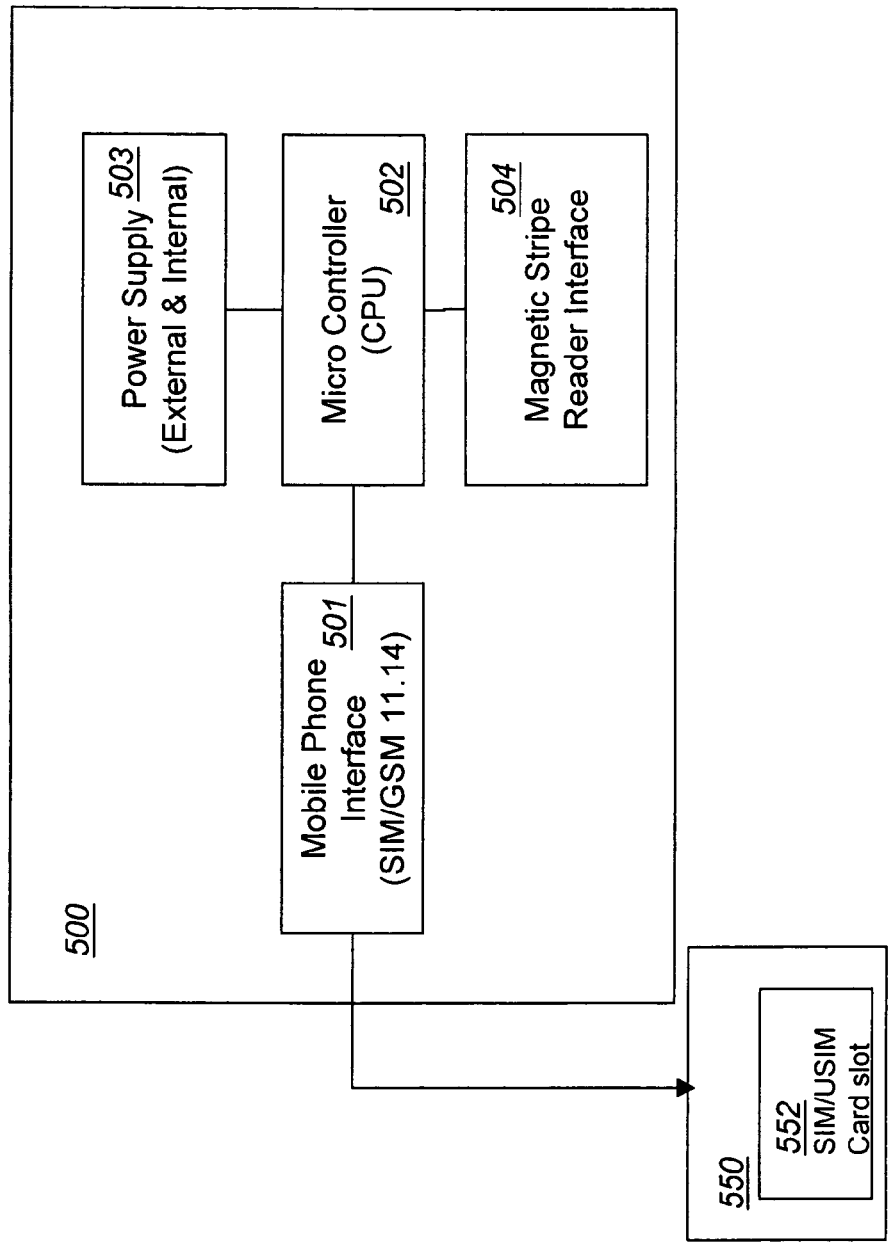
FIG. 3 illustrates a circuitry according to this invention for connecting a magnetic stripe reader module to the SIM/USIM port of a mobile phone.
Figure 4:
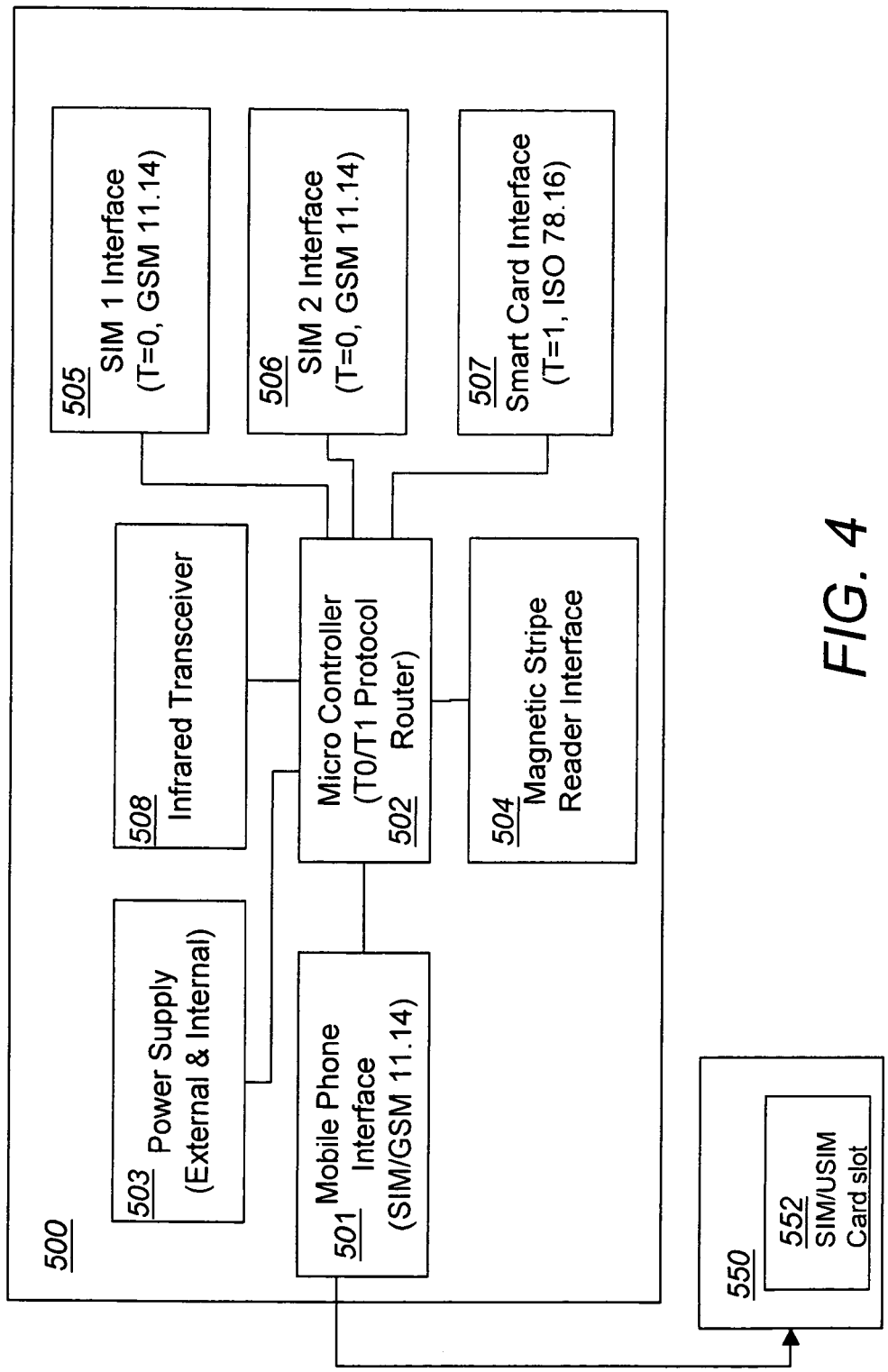
FIG. 4 illustrates a circuitry according to this invention for a mobile communication device attachment that converts a Single-SIM GSM phone into a Dual-SIM/Dual-Slot GSM phone with a magnetic stripe reader module.

Referring to FIG. 3, a magnetic stripe reader module 500 is connected to a wireless mobile phone 550 through a Subscriber Identification Module/Universal Subscriber Identification Module (SIM/USIM) card slot 552. The magnetic stripe reader module 500 includes a mobile phone interface adaptor (501) that connects to the Subscriber Identification Module/Universal Subscriber Identification Module (SIM/USIM) card slot circuitry 552 of the wireless mobile phone 550. In one example, the mobile phone interface adaptor 501 is described in WO 99/66752 application and U.S. Pat. No. 6,292,561 patent. The entire content of WO 99/66752 application and U.S. Pat. No. 6,292,561 patent is incorporated herein by reference. The magnetic stripe reader module 500 further includes a Micro Controller or Central Processing Unit (CPU) 502 that controls the mobile phone interface adaptor 501 and manages the routing of communications and controls between the mobile phone 550 and the magnetic stripe reader interface 504, as well as a plurality of smart cards. In addition to the magnetic stripe reader interface 504, module 500 includes a memory (not shown), SIM card interfaces 505, 506, adapted to receive SIM cards, infrared transceiver interface 508, and a smart card interface 507 that accepts contact-type cards (as shown in FIG. 4). The CPU 502 receives commands from the mobile phone 550, analyzes the commands and routes those commands to the appropriate interface. The magnetic stripe reader interface 504 receives activation commands and instructions via the CPU 502 from an application on any of the interfaces connected to the CPU 502, including an application on the mobile device interface 501, an application on the mobile phone 550, an application on the SIM Interface 505, an application on the SIM Interface 506, an application on the smart card Interface 507 or an application on the CPU 502 itself. Module 500 is powered by a power supply 503 which may be either internal to the module or external. The SIM/USIM interfaces 505, 506 can also be used as a Security Access Module (SAM) as required for merchant Point of Sale (POS) terminals. The infrared transceiver interface 508 can be utilized for transmitting data between the module 500 and an external device such as a printer enabling the printing of payment receipts. For existing mobile phones, the module 500 is an attachment that connects to the existing SIM slot on the mobile device. The module 500 can also be embedded within a mobile phone by connecting the interface point 501 to the circuitry of a SIM/USIM card slot.

Figure 5:
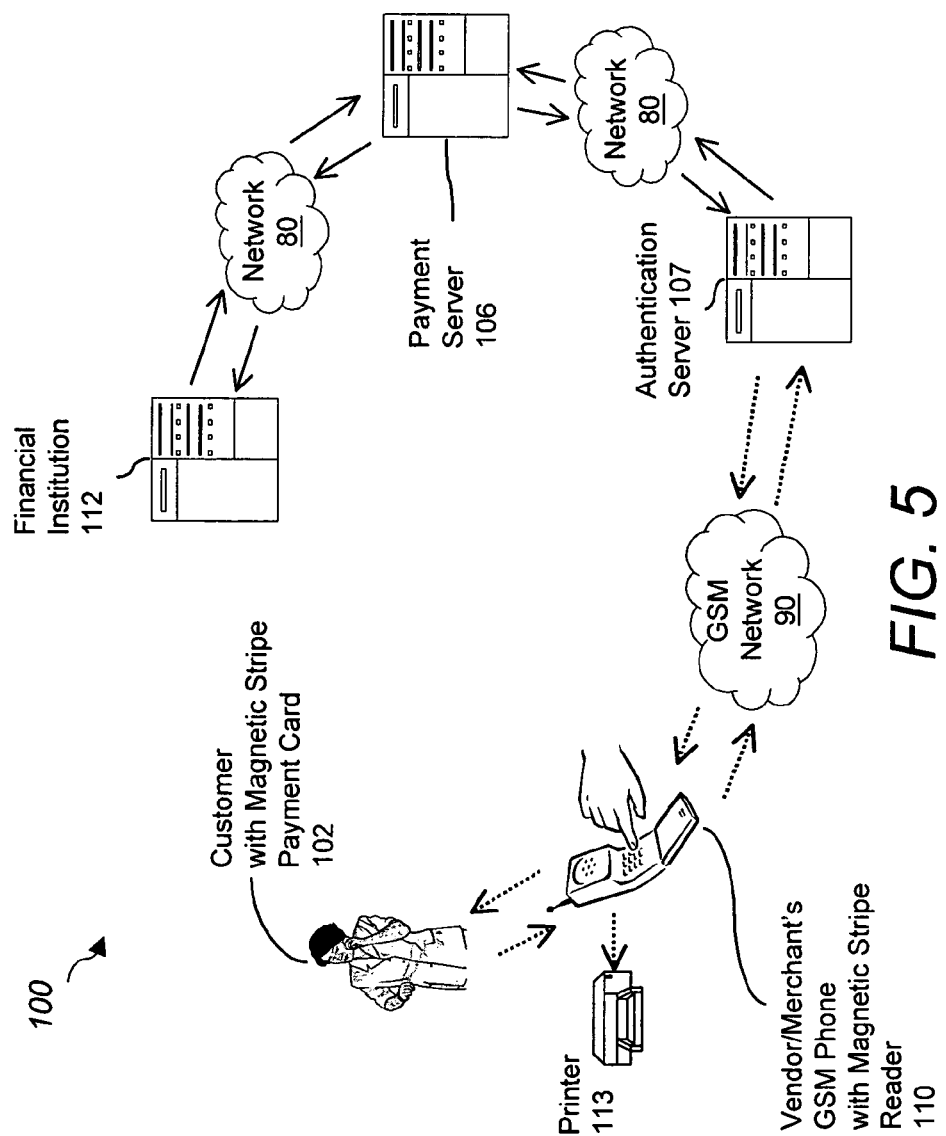
FIG. 5 is a schematic diagram of a payment system for conducting "face-to-face" payment transactions with a magnetic stripe payment card using a mobile communication device equipped with a magnetic stripe reader.

One embodiment of the present invention provides a magnetic stripe card payment system where the user of the mobile phone equipped with a magnetic stripe reader is able to accept magnetic stripe payment cards as a form of payment for face-to-face purchases. Referring to FIG. 5, a payment transaction system 100 for a face-to-face purchase of a product or a service includes a customer 102 with a magnetic stripe payment card, a merchant with a mobile phone 110 equipped with a magnetic stripe reader, a payment server 106, an authentication server 107, and a financial institution 112. The authentication server 107 and the mobile phone 100 establish communication and transmit data via a short message service (SMS) or by utilizing a General Packet Radio Service (GPRS) through a wireless Global System for Mobile Communication (GSM) network 90. The mobile phone 10 receives and transmits information from and to a magnetic stripe payment card. After completing the purchase of a product or a service with the merchant, the customer 102 provides the merchant with the magnetic stripe payment card to pay for the purchase. The merchant activates a mobile payment application on the mobile phone 110 and swipes the magnetic stripe payment card through the magnetic stripe reader of the mobile phone 110. Using the magnetic stripe reader on the mobile phone 110, the payment application on the mobile device reads the payment information stored in the magnetic stripe. For certain types of transactions, the payment application may request the customer for a Personal Identification Number (PIN) which the user enters using the keypad on the mobile device. The mobile phone with magnetic stripe reader 110 encrypts the transaction information and sends a message to the authentication server 107 over the wireless GSM network 90. The message includes the merchant vendor information, type of transaction, PIN and amount of transaction. The authentication server 107 validates the transaction from the mobile phone, decrypts the transaction information and routes the transaction to the payment server 106 over communication network 80. The payment server 106 connects to a financial institution 112 over communication network 80. The financial institution 112 processes the payment transaction, and sends a confirmation of the payment transaction to the payment server 106. Processing of the payment transaction entails approving, declining or otherwise. The payment server 106 routes the payment confirmation to the authentication server 107. The authentication server 107 encrypts and sends a message confirming the payment transaction to the merchant's mobile phone 110. In one example, the authentication server 107 is described in a co-pending patent application entitled "System and method for payment transaction authentication", the entire content of which is incorporated herein by reference.

Figure 6:
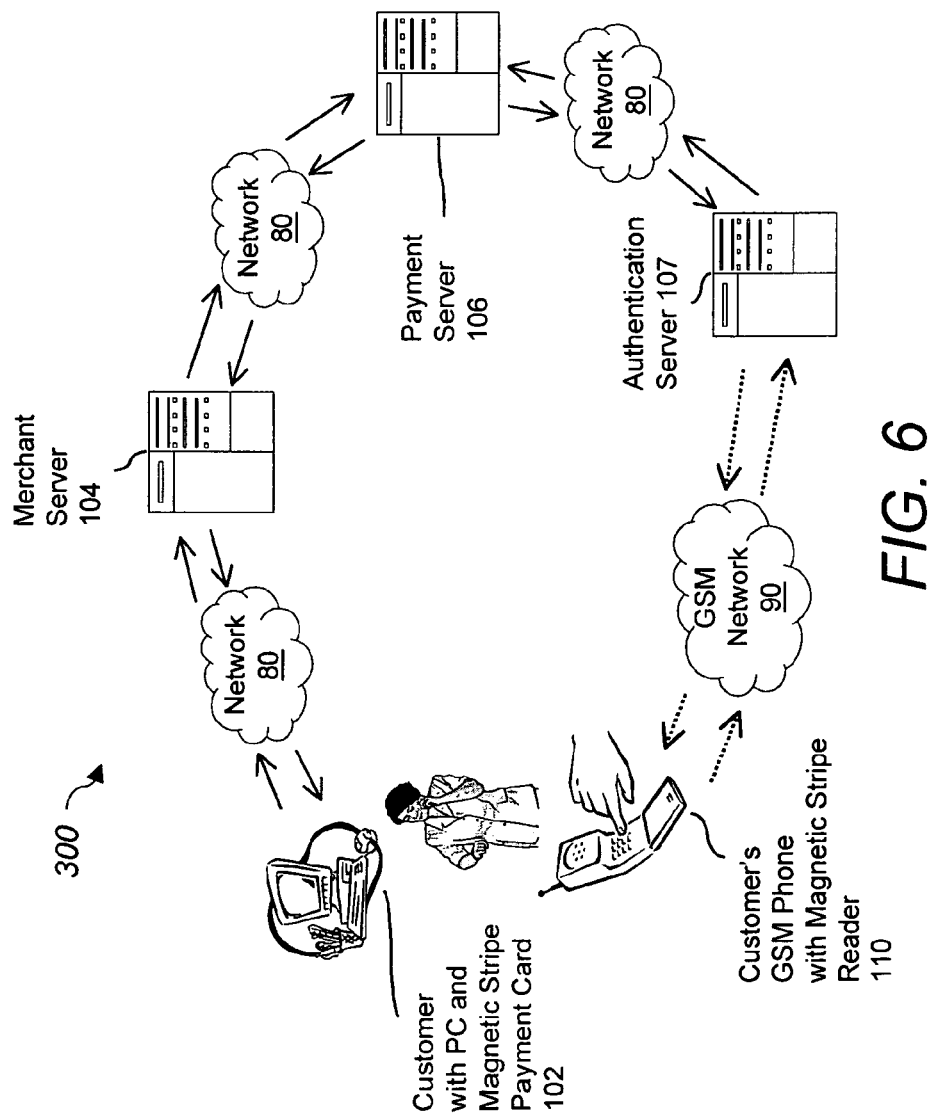
FIG. 6 is a schematic diagram of a system for conducting "non-face-to-face" remote payment transactions with a magnetic stripe payment card using a mobile communication device equipped with a magnetic stripe reader.
Figure 7:
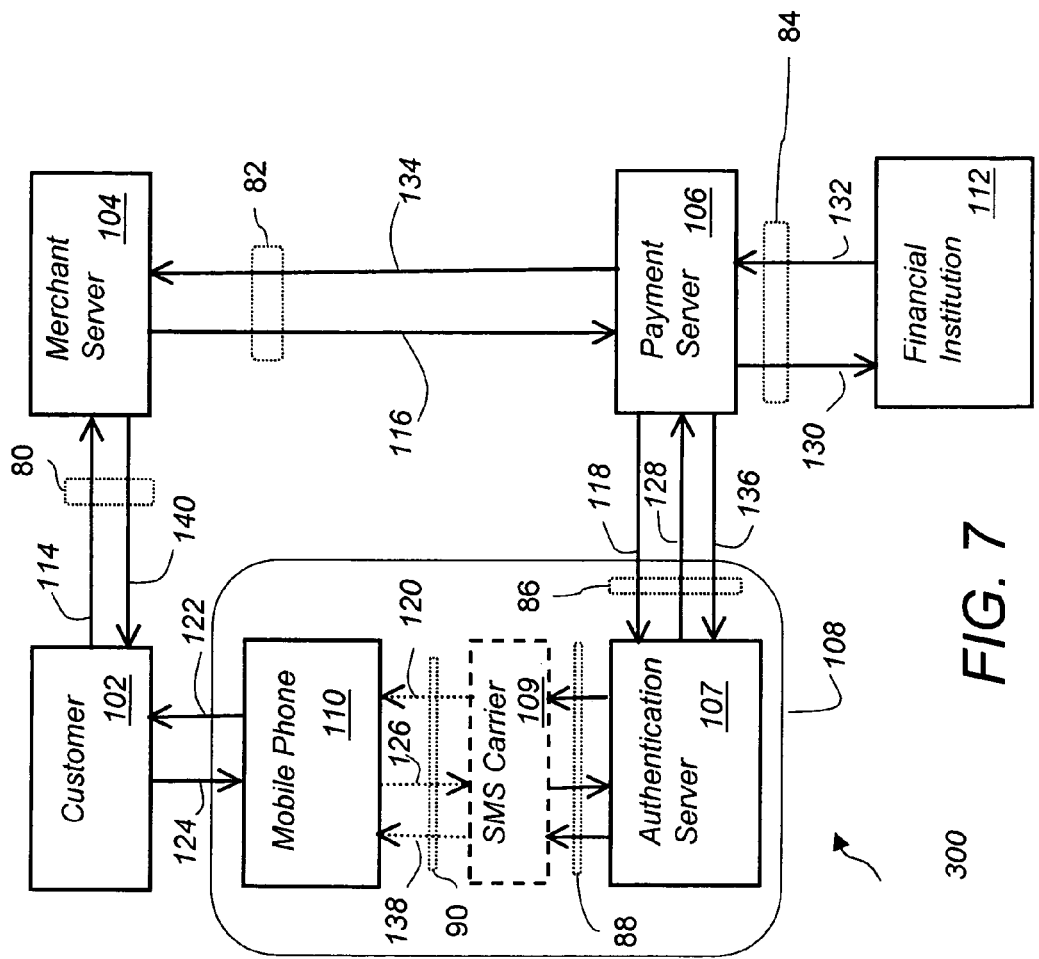
FIG. 7 is a block diagram of the remote payment system of FIG. 6.

In another embodiment, the present invention provides a magnetic stripe payment card payment system for consumers making remote "non face-to-face" purchasing and payment transactions. Referring to FIG. 6 and FIG. 7, a payment transaction system 300 includes a customer 102, a merchant server 104, a payment server 106, an authentication system 108, and a financial institution 112. The authentication system 108 includes an authentication server 107 that is adapted to send and receive messages to a mobile phone 110 via an SMS carrier or a GPRS provider 109. The mobile phone 110 is adapted to receive a magnetic stripe payment card (not shown). After having placed an order for an item or a service via the Internet 80, a customer 102 is asked to choose a payment method. The customer 102 chooses to pay via her mobile phone 110 and gives her mobile phone identification information to the merchant server 104 (114). In one example, the mobile phone identification information is the mobile phone number. The merchant server 104 routes the customer's mobile phone number and information about the purchase order to a payment server 106 (116). The payment server 106 contacts the authentication server 107 and routes the customer's mobile phone number and information about the purchase (118). The authentication server 107 sends a message to the customer's mobile phone 110 through an SMS carrier or a GPRS provider 109 (120). The customer 102 receives the message asking her to authorize the purchase and choose a payment method (122). The customer 102 authorizes the purchase, swipes the magnetic stripe payment card through the magnetic stripe reader on the mobile phone 110, and enters a security code (if required) to pay and authenticate her purchase (124). In one example, the security code is a personal identification number (PIN). Other examples include a password, digital signature, and a biometric identifier, i.e., retina scan, fingerprint, DNA scan, voice characteristics. The payment card is identified with information that is embedded in the magnetic stripe of the card. In one example the identification information is a payment card number. Other examples of payment card identification include an encrypted transaction signature that can only be decrypted by the financial institution that has issued the payment card, expiration date of the payment card, and a digital signature. The mobile phone 110 sends a message via the SMS Carrier or the GPRS provider 109 to the authentication server 107. The message includes the authorization result (if required) and payment transaction information. The authentication server 107 routes the authorized purchase order and authenticated card to the payment server 106 (128). The payment server 106 contacts the financial institution 112 that has issued the payment card and routes the payment card information and the purchase order information (130). The financial institution 112 processes the payment transaction and sends a confirmation of the payment transaction to the payment server 106 (132). The payment server 106 routes the payment confirmation to the merchant server 104 (134) and to authentication server 107 (136). The authentication server 107 sends a message confirming the payment transaction to the customer's mobile phone 110 (138). Finally the merchant 104 fulfills the customer's purchase order (140).

Other embodiments are within the scope of the following claims. For example, the mobile phone identification information may be an Internet Protocol (IP) address. The communication networks 80, 82, 84, 86, 88 and 90 may be wireless or wired networks. The communication networks 80, 82, 84, 86, 88 and 90 may be non face-to-face via the Internet, VPN (Virtual Private Network), cable network, data network, telephone network, private voice and data networks, public voice and data networks, and mail or person to person. Payment card identification may occur via the payment card number or via an encrypted transaction signature that can only be decrypted by the financial institution that has issued the payment card. The authentication server may also utilize a password, digital signature, or a biometric identifier, i.e., retina scan, fingerprint, voice characteristics, to authenticate the payment transaction. The payment authentication instrument may be contained in the magnetic stripe payment card, on the SIM smart cards within the mobile phone 110, or within another full-size smart card that needs to be inserted into a smart card reader slot. The communication between the authentication server 107 and the mobile phone 110 may be via a proprietary message protocol that utilizes User Datagram Protocol (UDP) on top of Internet Protocol (IP). This proprietary message protocol is adapted to be used with wireless networks that support Transmission Control Protocol/Internet Protocol (TCP/IP). These wireless networks include Bluetooth, 3G, GPRS, 2.5 G, Infrared, 802.11a and 802.11b. Several embodiments of the present invention have been described. Nevertheless, it will be understood that various modifications may be made without departing from the spirit and scope of the invention. Accordingly, other embodiments are within the scope of the following claims.

What is claimed is:

1. A wireless mobile device adapted to access a wireless network comprising:
   a subscriber identification module (SIM) card slot;
   a magnetic stripe reader module electrically connected to said SIM card slot;
   a memory;
   a Central Processing Unit (CPU);
   a SIM card connected to said SIM card slot, said SIM card authenticating said wireless mobile device to said wireless network;
   a first application program associated with said memory and said CPU and being adapted to receive and transmit instructions from said magnetic stripe reader module to said wireless mobile device and the reverse; and
   wherein said magnetic stripe reader module is adapted to receive and read information stored in a magnetic stripe and simultaneously transmit said information to an entity via said wireless network.

2. The wireless mobile device of claim 1 further comprising a payment card comprising said magnetic stripe and wherein said information is selected from a group consisting of payment card owner identification information, payment card identification information, authentication information, payment card issuer information, and financial institution information.

3. The wireless mobile device of claim 1 wherein said wireless mobile device is selected from a group consisting of a mobile phone, a personal digital assistant, a pager, a wireless laptop computer, a personal computer, a television remote control, and combinations thereof.

4. The wireless mobile device of claim 1 further comprising a second application program associated with said memory and said CPU and being adapted to route and transmit data and information between said wireless mobile device, said magnetic stripe reader module, and other interfaces connected to said CPU.

5. The wireless mobile device of claim 4 wherein said other interfaces are selected from a group consisting of smart card interfaces, infrared transceiver interfaces, serial communication interfaces, and contactless card reader interfaces.

6. The wireless mobile device of claim 4 wherein said first and second application programs are stored in storage selected from a group consisting of said CPU, said SIM card, an external SIM card, said magnetic stripe, and an external card.

7. The wireless mobile device of claim 4 wherein said other interfaces comprise an infrared transceiver adapted to transmit data to an external device equipped with another infrared transceiver.

8. The wireless mobile device of claim 7 wherein said external device comprises a printer.

9. The wireless mobile device of claim 1 wherein said wireless network is selected from a group consisting of a wireless wide area network (WWAN), a wireless local area network (WLAN), a private network, and a personal area network (PAN).

10. The wireless mobile device of claim 9 wherein said wireless wide area network (WWAN) is selected from a group consisting of a Global System for Mobile Communications (GSM), a General Packet Radio Service (GPRS), a Code Division Multiple Access (CDMA), CDMA 2000, and wideband CDMA (WCDMA).

11. The wireless mobile device of claim 1 wherein said wireless mobile device is used for making financial transactions between a user and said entity with a payment card comprising said magnetic stripe over said network.

12. The wireless mobile device of claim 11 wherein said financial transactions between said user and said entity are face-to-face.

13. The wireless mobile device of claim 11 wherein said financial transactions between said user and said entity are remote.

14. An electronic payment method utilized by a customer to pay a merchant with a payment card comprising a magnetic stripe for a face-to-face purchase of a good or service comprising:
   placing an order by said customer for said purchase of said good or service to said merchant;
   providing a wireless mobile device wherein said wireless mobile device is adapted to access a wireless network and comprises a subscriber identification module (SIM) card slot and a magnetic stripe reader module electrically connected to said SIM card slot and wherein said magnetic stripe reader module is adapted to receive and read information stored in said magnetic stripe and transmit said information via said wireless network;
   entering information of said purchase in said wireless mobile device;
   swiping said magnetic stripe through said magnetic stripe reader, retrieving payment card identification information from said magnetic stripe and authorizing payment for said good or service;
   formatting said purchase information, said payment card identification information and said payment authorization into a first message and sending said first message to an authentication server via said wireless network;
   authenticating and sending said first message by said authentication server to a financial institution;
   registering said purchase information and sending approval for said payment by said financial institution to said authentication server;
   forwarding said payment approval to said wireless mobile device; and
   fulfilling said order to said customer by said merchant.

15. The electronic payment method of claim 14 wherein said first message comprises a format selected from a group consisting of Short Message Service (SMS), General Packet Radio Service (GPRS), Transmission Control Protocol/Internet Protocol (TCP/IP), User Datagram Protocol (UDP), Simple Mail Transmission Protocol (SMTP), Simple Network Management Protocol (SNMP), and proprietary message formats.

16. The electronic payment of claim 14 further comprising printing a receipt.

17. An electronic payment method utilized by a customer to pay a merchant with a payment card comprising a magnetic stripe for a remote purchase of a good or service comprising:
   placing an order by said customer for said purchase of said good or service to a merchant server via a first network and choosing to pay via a wireless mobile device wherein said wireless mobile device is adapted to access a wireless network and comprises a subscriber identification module (SIM) card slot and a magnetic stripe reader module electrically connected to said SIM card slot and wherein said magnetic stripe reader module is adapted to receive and read information stored in said magnetic stripe and transmit said information via said wireless network;
   providing said merchant server with an identification information for said wireless mobile device;
   creating a digital order comprising purchase information and said identification number for said wireless mobile device by said merchant server;
   routing said digital order to an authentication server via said first network;
   formatting said digital order into a first message wherein said first message is adapted to be transmitted over said wireless network;
   routing said first message over said wireless network to said wireless mobile device;
   displaying said first message on said wireless mobile device;
   requesting and receiving authorization of payment from the customer via said wireless mobile device;
   swiping said magnetic stripe through said magnetic stripe reader and retrieving payment card identification and security information;
   formatting authorization result and payment card identification and security information into a second message and routing said second message to said authentication server;

authenticating and routing said second message to a financial institution, wherein said financial institution is the issuer of said payment card; and approving and executing said payment at said financial institution.

forwarding said payment approval to said authentication server and from said authentication server to said wireless mobile device; and fulfilling said order to said customer by said merchant.

18. The electronic payment method of claim 17 wherein said wireless mobile device is selected from a group consisting of a mobile phone, a personal digital assistant, a pager, a wireless laptop computer, a personal computer, a television remote control, and combinations thereof.

19. The electronic payment method of claim 17 wherein said wireless network is selected from a group consisting of a wireless wide area network (WWAN), a wireless local area network (WLAN), a private network, and a personal area network (PAN).

20. The electronic payment method of claim 17 wherein said wireless wide area network (WWAN) is selected from a group consisting of a Global System for Mobile Communications (GSM), a General Packet Radio Service (GPRS), a Code Division Multiple Access (CDMA), CDMA 2000, and wideband CDMA (WCDMA).

21. The electronic payment method of claim 17 wherein said first and second messages comprise a format selected from a group consisting of Short Message Service (SMS), General Packet Radio Service (GPRS), Transmission Control Protocol/Internet Protocol (TCP/IP), User Datagram Protocol (UDP), Simple Mail Transmission Protocol (SMTP), Simple Network Management Protocol (SNMP), and proprietary message formats.

* * * * *